United States Patent
Meroux et al.

(10) Patent No.: US 12,397,660 B2
(45) Date of Patent: Aug. 26, 2025

(54) VEHICLE-TO-VEHICLE CHARGING

(71) Applicant: Ford Global Technologies, LLC, Dearborn, MI (US)

(72) Inventors: Dominique Meroux, Fair Oaks, CA (US); Kai Wu, Ann Arbor, MI (US); Chen Zhang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 18/434,986

(22) Filed: Feb. 7, 2024

(65) Prior Publication Data
US 2025/0249762 A1 Aug. 7, 2025

(51) Int. Cl.
*B60L 53/00* (2019.01)

(52) U.S. Cl.
CPC ........... *B60L 53/00* (2019.02); *B60L 2240/62* (2013.01)

(58) Field of Classification Search
CPC .............................. B60L 53/00; B60L 2240/62
See application file for complete search history.

(56) References Cited

U.S. PATENT DOCUMENTS

| | | | |
|---|---|---|---|
| 9,994,111 B2 | 6/2018 | Stegmueller et al. | |
| 10,272,909 B1 * | 4/2019 | Melatti | B60W 10/30 |
| 10,391,873 B2 * | 8/2019 | Köhnke | B60L 53/65 |
| 11,091,049 B2 * | 8/2021 | Song | H02J 7/0068 |
| 11,110,812 B2 * | 9/2021 | Miller | B60L 53/126 |
| 11,124,078 B2 * | 9/2021 | Miller | B60L 58/12 |
| 11,133,688 B2 * | 9/2021 | Schaffer | B60L 53/305 |
| 11,152,799 B2 * | 10/2021 | Schaffer | B60L 53/305 |
| 11,152,814 B2 * | 10/2021 | Martin | B60L 53/35 |
| 11,220,190 B2 * | 1/2022 | Schütz | B60L 53/31 |
| 11,420,530 B2 * | 8/2022 | Akhavan-Tafti | B60L 53/62 |
| 11,641,128 B2 * | 5/2023 | Martin | B60L 53/35 320/101 |
| 11,858,369 B2 * | 1/2024 | Books | B60L 53/53 |
| 11,890,957 B2 * | 2/2024 | Chakraborty | G07F 15/005 |
| 11,906,975 B2 * | 2/2024 | Hashizume | G05D 1/648 |
| 2017/0174092 A1 * | 6/2017 | Köhnke | G05D 1/0088 |
| 2019/0135125 A1 * | 5/2019 | Sponheimer | B60L 53/12 |
| 2019/0135133 A1 * | 5/2019 | Miller | B60L 53/34 |

(Continued)

FOREIGN PATENT DOCUMENTS

EP 4253132 A1 10/2023

OTHER PUBLICATIONS

Tajalli, S. Z., et al., "A Cloud-Edge-Based Framework for Electric Vehicle Emergency Energy Trading," mdip inventions, Jan. 19, 2023, 18 pages.

*Primary Examiner* — Peter D Nolan
(74) *Attorney, Agent, or Firm* — Christopher Storms; Brooks Kushman P.C.

(57) ABSTRACT

A method for vehicle-to-vehicle charging includes identifying a plug-in hybrid electric vehicle (PHEV) for charging based on a determination that the PHEV's engine will start prior to the PHEV's battery being charged from an external power source. The method can include identifying a battery electric vehicle (BEV) to provide charging to the identified PHEV and transmitting location information to at least one of the PHEV or the BEV for navigating to the location of the other of the PHEV or the BEV. An electrical connection between the BEV and the PHEV is verified and a BEV to PHEV charging process is actuated.

20 Claims, 3 Drawing Sheets

(56) References Cited

U.S. PATENT DOCUMENTS

| | | | |
|---|---|---|---|
| 2019/0359073 A1* | 11/2019 | Song | H02J 7/0068 |
| 2019/0381910 A1* | 12/2019 | Akhavan-Tafti | B60L 53/65 |
| 2020/0317067 A1* | 10/2020 | Miller | H02J 50/80 |
| 2020/0317077 A1* | 10/2020 | Schaffer | B60L 53/305 |
| 2020/0317084 A1* | 10/2020 | Schaffer | B60L 53/305 |
| 2021/0155108 A1* | 5/2021 | Martin | B60L 53/35 |
| 2021/0347275 A1* | 11/2021 | Chakraborty | G06Q 10/06315 |
| 2022/0014038 A1* | 1/2022 | Martin | H02J 7/0042 |
| 2022/0024330 A1* | 1/2022 | Books | G06Q 10/06315 |
| 2022/0306076 A1* | 9/2022 | Diamond | B60W 20/20 |
| 2022/0402477 A1* | 12/2022 | Huh | B60W 10/26 |
| 2023/0012166 A1 | 1/2023 | Disley et al. | |
| 2023/0053614 A1* | 2/2023 | Baudisch | B60W 50/0097 |

\* cited by examiner

VEHICLE-TO-VEHICLE CHARGING

BACKGROUND

Plug-in hybrid electric vehicles (PHEVs) use batteries to power an electric motor for operating in various scenarios such as urban driving, and an internal combustion engine in certain scenarios, such as to power the vehicle for rapid speed changes, when the battery is low on charge, and/or to compensate for heating and air conditioning loads. PHEVs can charge their batteries from the electric power grid much like battery electric vehicles (BEV). Using electricity from the battery to run the PHEV can reduce fuel use and/or produce lower levels of emissions than an internal combustion engine.

DETAILED DESCRIPTION

Figure 1:
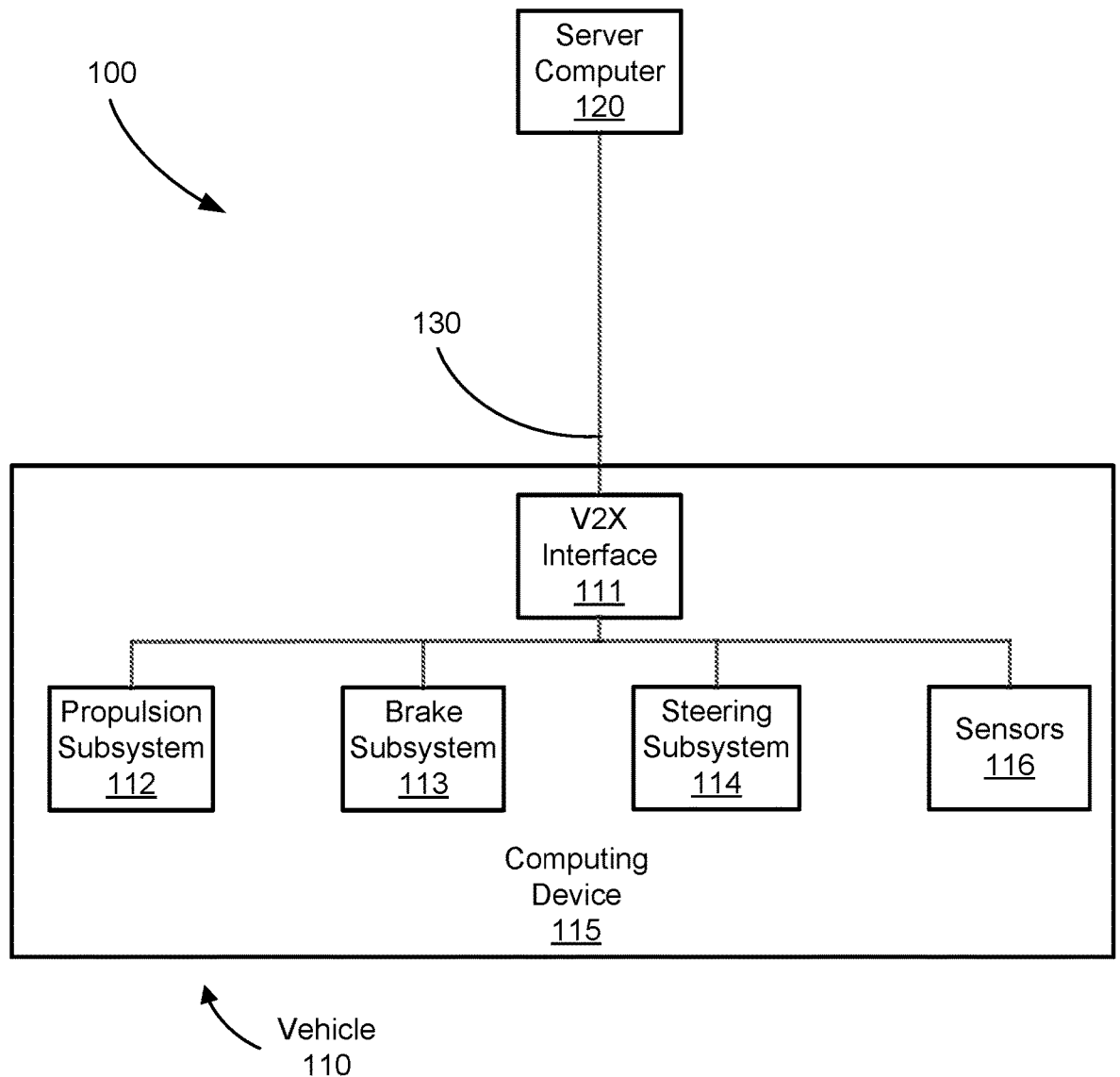
FIG. 1 is a block diagram of an example vehicle system.

This disclosure provides techniques for actuating a charging process upon identifying a PHEV for charging based on a determination that the PHEV's engine will otherwise start to provide charging. A BEV can be identified to provide charging to the identified PHEV, thereby preventing the PHEV's engine from starting. Running a PHEV with electricity from a battery can reduce fuel usage and/or produce lower levels of emissions. Most of the gas emissions from a typical trip or drive session occur immediately after start-up of an internal combustion engine during the time it takes a catalytic converter to warm up to the temperature at which catalytic reactions are initiated. The disclosed technology helps prevent the PHEV's internal combustion engine from being started thereby typically reducing emissions and/or increasing the miles a PHEV travels on battery power.

Disclosed herein is a method for vehicle-to-vehicle charging including identifying a plug-in hybrid electric vehicle (PHEV) for charging based on a determination that the PHEV's engine will start prior to the PHEV's battery being charged from an external power source. The method also includes identifying a battery electric vehicle (BEV) to provide charging to the identified PHEV to prevent the PHEV's engine from starting. Location information can be transmitted to at least one of the PHEV or the BEV for navigating to the location of the other of the PHEV or the BEV. An electrical connection between the BEV and the PHEV is verified and a BEV to PHEV charging process is actuated.

The method can include determining that the PHEV's engine will start based on a state-of-charge of the PHEV's battery and an ambient temperature.

Determining that the PHEV's engine will start can include determining that the PHEV's air conditioner or heater will activate when the ambient temperature is outside a specified range.

Determining that the PHEV's engine will start can include determining that the state-of-charge of the PHEV's battery provides a range that is less than a distance to the external power source.

Determining that the PHEV's engine will start can include determining that a battery thermal management system will activate when a temperature of the PHEV's battery is outside a specified range.

The method can include monitoring the charging process to determine an amount of energy transferred from the BEV to the PHEV.

The method can include determining additional all electric vehicle miles traveled based on the amount of energy transferred from the BEV to the PHEV.

Identifying the BEV can include identifying the BEV based on a state-of-charge of the BEV's battery.

Identifying the BEV can include identifying the BEV based on proximity and/or travel time to a destination in common with the PHEV.

The method can include displaying a notification regarding the location of a BEV that is available for charging on a graphical user interface of the PHEV.

Disclosed herein is a system including a vehicle computer including a processor and memory. The memory including instructions executable by the vehicle computer to determine that a PHEV needs charging based on a determination that the PHEV's engine will start prior to the PHEV's battery being charged from an external power source and verify an electrical connection between a BEV and the PHEV. The system also includes a server computer including a processor and a memory. The memory including instructions executable by the server computer to identify the BEV to provide charging to the PHEV, transmit location information to at least one of the PHEV or the BEV for navigating to the location of the other of the PHEV or the BEV, and actuate a BEV to PHEV charging process.

The instructions to determine that the PHEV's engine will start can include instructions to determine that the PHEV's air conditioner or heater will activate when an ambient temperature is outside a specified range.

The instructions to determine that the PHEV's engine will start can include instructions to determine that a state-of-charge of the PHEV's battery provides a range that is less than a distance to the external power source.

The instructions to identify the BEV can include instructions to identify the BEV based on a state-of-charge of the BEV's battery.

The instructions to identify the BEV can include instructions to identify the BEV based on proximity and/or travel time to a destination in common with the PHEV.

The instructions to transmit location information can include instructions to display a notification regarding the location of a BEV that is available for charging on a graphical user interface of the PHEV.

Disclosed herein is a system including a vehicle computer including a processor and memory. The memory including instructions executable by the vehicle computer to verify an electrical connection between a BEV and a PHEV and actuate a BEV to PHEV charging process. The system also includes a server computer including a processor and a memory. The memory including instructions executable by the server computer to identify the PHEV for charging based on a determination that the PHEV's engine will start prior to the PHEV's battery being charged from an external power source, identify the BEV to provide charging to the identified PHEV, and transmit location information to at least one of the PHEV or the BEV for navigating to the location of the other of the PHEV or the BEV.

The instructions to determine that the PHEV's engine will start can include instructions to determine that the PHEV's air conditioner or heater will activate when an ambient temperature is outside a specified range.

The instructions to determine that the PHEV's engine will start can include instructions to determine that a state-of-charge of the PHEV's battery provides a range that is less than a distance to the external power source.

The instructions to identify the BEV can include instructions to identify the BEV based on a state-of-charge of the BEV's battery.

FIG. 1 is a diagram of an example system 100. The system 100 includes a vehicle 110, operable by a user and/or according to control by a computing device or devices 115 which can include one or more vehicle electronic control units (ECUs) or computers, such as are known, possibly including additional hardware, software, and/or programming as described herein. A computing device 115 can receive data regarding the operation of the vehicle 110 from sensors 116. A computing device 115 may operate the vehicle 110 or components thereof instead of or in conjunction with control by a human user. The system 100 can further include a remote (i.e., external to the vehicle) server computer 120 that can communicate with the vehicle 110 via a network 130.

The computing device 115 can include one or more processors and one or more memory devices such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of speed in the vehicle 110 by controlling one or more of an internal combustion engine, electric motor, hybrid engine, etc.), steering, climate control, interior and/or exterior lights, etc.

The computing device 115 may include or be communicatively coupled to, e.g., via a vehicle communications bus as described further below, more than one computing device, e.g., controllers, ECUs, or the like included in the vehicle 110 for monitoring and/or controlling various vehicle subsystems, e.g., a propulsion subsystem 112, a brake subsystem 113, a steering subsystem 114, etc. The computing device 115 is generally arranged for communications on a vehicle communication network, e.g., including a bus in the vehicle 110 such as a controller area network (CAN) or the like. The vehicle network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, e.g., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles through V2X (vehicle-to-everything) interface 111 using vehicle-to-vehicle (V-to-V) networks, e.g., according to including cellular communications (C-V2X) wireless communications cellular, Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device.

As already mentioned, generally included in instructions stored in the memory and executable by the processor of the computing device 115 is programming for operating one or more vehicle 110 components, e.g., braking, steering, propulsion, etc. Using data received in the computing device 115, e.g., the sensor data from the sensors 116, the server computer 120, etc., the computing device 115 may make various determinations and/or control various vehicle 110 components and/or operations.

Each of the subsystems 112, 113, 114 may include respective processors and memories and/or one or more actuators. The subsystems 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a GNSS sensor disposed in the vehicle 110 may provide geographical coordinates of the vehicle 110. The distance(s) provided by the radar and/or other sensors 116 and/or the geographical coordinates provided by the GNSS sensor may be used by the computing device 115 to operate the vehicle 110.

The vehicle 110 is generally a land-based vehicle 110 having three or more wheels, e.g., a passenger car, light truck, etc. The vehicle 110 includes one or more sensors 116, the V2X interface 111, the computing device 115 and one or more subsystems 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles. The sensors 116 may further be used to collect data including dynamic vehicle data related to operations of the vehicle 110 such as velocity, yaw rate, steering angle, engine speed, brake pressure, oil pressure, the power level applied to subsystems 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2X interface 111 and computing device 115, and therefore these features will not be described further. A server computer 120 can be used to develop and train software that can be transmitted to a computing device 115 in a vehicle 110.

Figure 2:
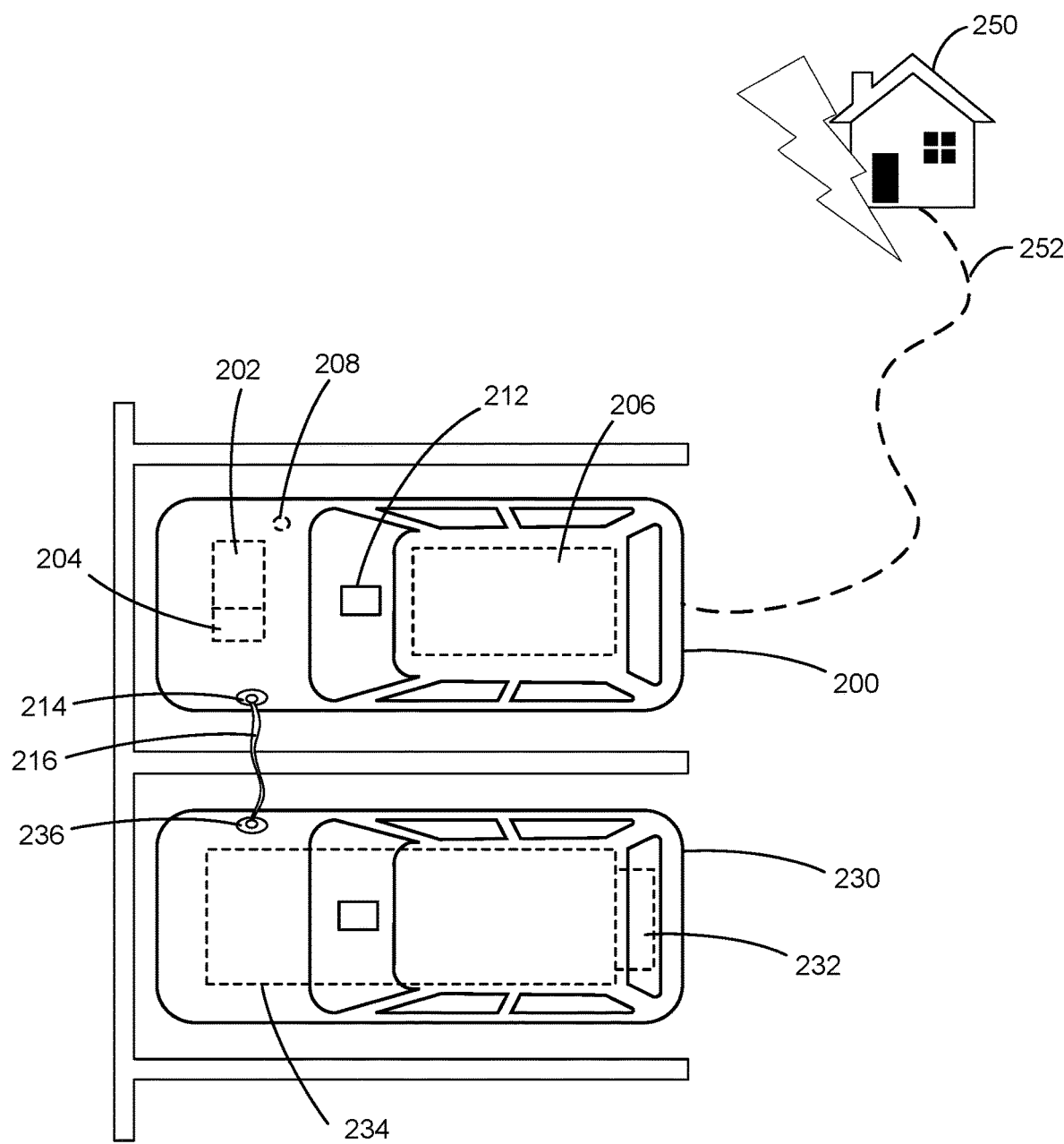
FIG. 2 is a schematic diagram of vehicle-to-vehicle charging.

With reference to FIG. 2, a PHEV 200 can include a battery 206 to power an electric motor 204. The PHEV 200 can also include an internal combustion engine 202 to power the vehicle, e.g., for rapid speed changes, when the battery 206 is low on charge, and/or to compensate for heating and air conditioning loads. PHEVs can charge their batteries 206 from the electric power grid and/or with the internal combustion engine 202.

Running the vehicle with electricity from the battery 206 can reduce fuel usage and may also produce lower levels of emissions. Most of the gas emissions from a single average drive originate immediately after start-up of an internal combustion engine during the time it takes a catalytic converter to warm up to a temperature at which catalytic reactions are initiated. The disclosed technology helps prevent the PHEV's internal combustion engine 202 from being started in order to reduce emissions and to increase the miles a PHEV travels on battery power, i.e., electric vehicle miles traveled (eVMT).

A PHEV 200 can also be charged via vehicle-to-vehicle charging. For example, PHEV 200 can be charged by a BEV 230. BEV 230 includes a battery 234 to power an electric motor 232. BEVs typically have larger battery capacity than PHEVs and may, for example, have excess range relative to daily activities, e.g., in an urban setting with opportunities for regenerative braking that recharges batteries when the BEV slows. This excess range could provide energy that is available for charging a PHEV, for example. The BEV 230 can charge the PHEV 200 with a charging cable 216 that connects to the PHEV's charging port 214 and the BEV's charging port 236.

A PHEV in need of charging can be identified based on a determination that the PHEV's engine will start prior to the PHEV's battery being charged from an external power source. For example, if the distance 252 to the PHEV's next charging location (e.g., home charging station 250) is beyond the range that its battery 206 can provide given its current state-of-charge, then it can be determined that the PHEV's engine 202 will start in order to propel the vehicle and/or to charge the battery 206. In an example, the vehicle computing device 115 of the PHEV 200 can determine the distance 252 to the next charging location based on its current position and a known destination, such as the home charging station 250. The PHEV 200 could also calculate an estimated range based on the state-of-charge of battery 206. Alternatively or in addition, a server computer 120 can receive location, destination, and state-of-charge information from the PHEV to make these calculations. In the context of this application, external power source means a power source other than the PHEV's internal combustion engine 202, such as a home-based charging station 250 and public charging stations connected to, e.g., the grid.

The ambient temperature around the PHEV 200 can influence whether the engine 202 will start. If the ambient temperature is above a high temperature threshold it can be determined that a vehicle air conditioner will activate via thermostat control or is likely to be activated by a user. Similarly, if the ambient temperature is below a low temperature threshold it can be determined that the heater will activate or be activated by the user. In other words, if the ambient temperature is outside a specified range, as measured by a vehicle temperature sensor 208, it can be determined that the PHEV's air conditioner or heater will be activated. Activating the air conditioner or heater requires energy from the battery that may necessitate the PHEV's engine 202 being started depending on the state of charge of the battery 206 and the distance 252 to the next charging location 250. In an example, the high and low temperature thresholds can be determined empirically, e.g., by testing vehicles in various ambient temperatures to determine when an air conditioner or heater is activated by a user and/or a thermostat. Alternatively or additionally, vehicle design parameters, e.g., a temperature at which a thermostat is programmed to trigger activation of air conditioner or heater could be used.

In another example, the PHEV's battery thermal management system (BTMS) may need to be activated depending on the ambient temperature. The BTMS helps to maintain the battery 206 at its optimal temperature range. Cold battery pack temperatures can reduce the charge/discharge capacity and power capabilities of the battery 206. Higher battery temperatures can also result in performance degradation including loss of capacity and power. If the ambient temperature is above a high temperature threshold or below a low temperature threshold it can be determined that the BTMS will activate. In other words, if the ambient temperature is outside a specified range, as measured by a vehicle temperature sensor 208, it can be determined that the PHEV's BTMS will be activated. Activating the BTMS requires energy from the battery that may necessitate the PHEV's engine 202 being started depending on the state of charge of the battery 206 and the distance 252 to the next charging location 250. In an example, the high and low temperature thresholds can be determined empirically, e.g., by testing vehicles in various ambient temperatures to determine when a BTMS is activated by e.g., a thermostat. Alternatively or additionally, vehicle design parameters, e.g., a battery temperature at which a thermostat is programmed to trigger activation of the BTMS could be used.

In an example, when it is determined that the PHEV's air conditioner or heater will be activated, the estimated range that its battery 206 can provide given its current state-of-charge can be reduced, e.g., according to any suitable technique for range estimation, such as according to an empirically determined factor, e.g., 20 percent. If the distance 252 to the PHEV's next charging location (e.g., home charging station 250) is beyond this reduced range, then it can be determined that the PHEV's engine 202 will start.

In order to prevent the PHEV's engine 202 from starting, the PHEV 200 can be charged with an available BEV 230. An available BEV 230 can be identified based on a state-of-charge of the BEV's battery 234. In an example, a user of the BEV 230 can set a minimum state-of-charge threshold for being available to charge other vehicles. Alternatively, the user can set a minimum extra margin of range beyond that which is necessary to reach the BEV's next charging location as a precondition for availability to charge other vehicles. Identifying an available BEV 230 can also include identifying the BEV based on its location, e.g., a proximity, and/or travel time, to a destination in common with the PHEV 200. For example, a maximum travel time threshold, e.g., 15 minutes, for traveling to a common destination can be set to help ensure that both vehicles will be in the same place at the same time. Once a PHEV 200 is identified for receiving charging and an available BEV 230 is identified to provide charging, the system can transmit location information to the PHEV and/or the BEV for navigating to a common location, such as a grocery store. The PHEV and/or the BEV can transmit their current location and/or a destination to a server computer 120 that matches the current locations with a common location for charging. The destination locations for each vehicle could be input by the user of each vehicle as part of an itinerary, for example. Location/navigation information can be provided to a human-machine-interface (HMI) 212 in the PHEV and/or BEV.

The system can verify that an electrical connection between the BEV and the PHEV has been established, e.g., via cable 216, and actuate a BEV to PHEV charging process. The system can also monitor the charging process to determine an amount of energy transferred from the BEV to the PHEV. The system can determine an emissions reduction and additional eVMT realized by preventing the PHEV's engine from starting based on the amount of energy transferred from the BEV to the PHEV. In an example, expected emissions reductions can be considered in matching a BEV and PHEV to charge. For example, marginal emissions (e.g., $CO_2$) and changes to smart charging schedules can be considered.

Figure 3:
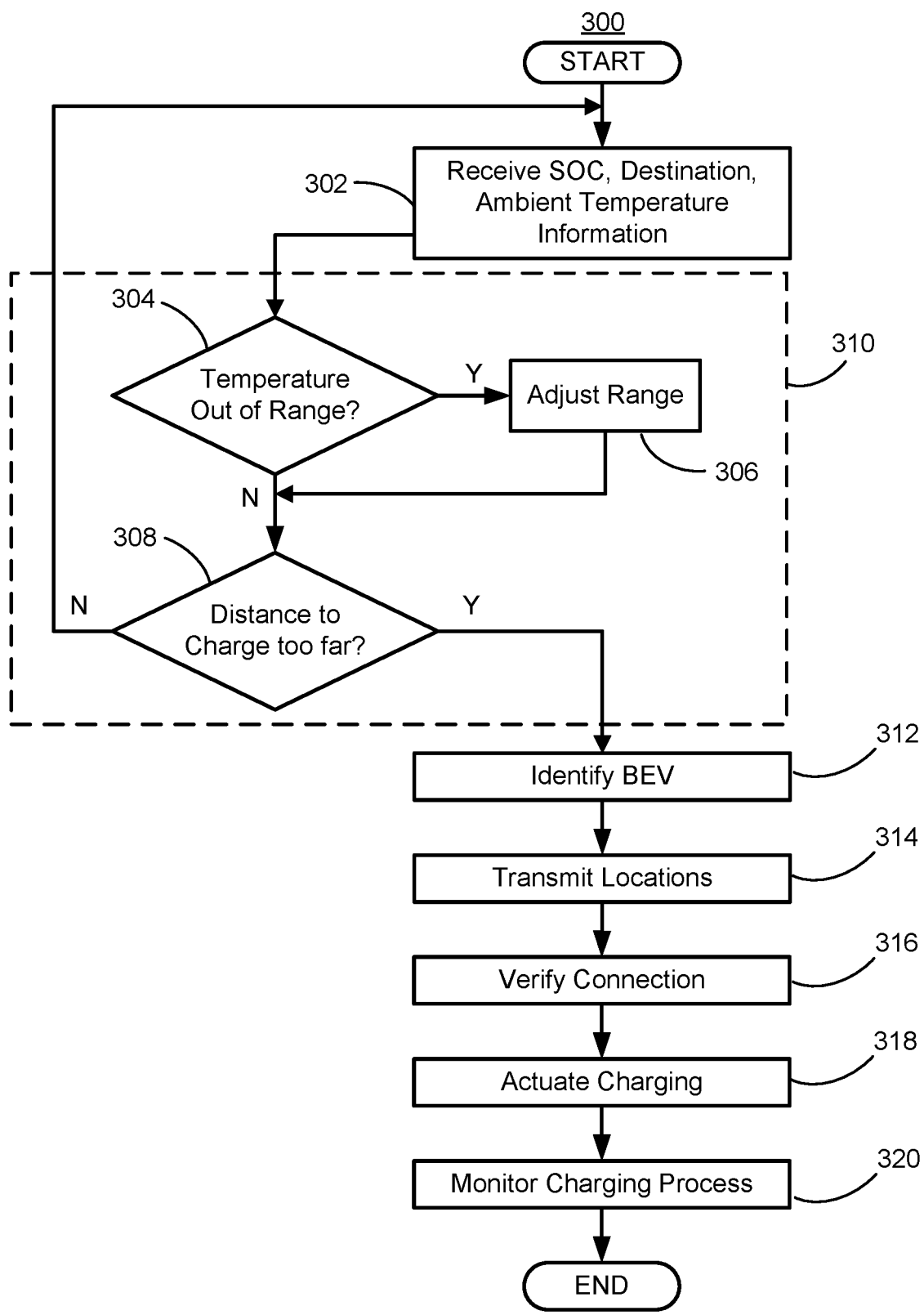
FIG. 3 is a flowchart diagram of an example process for vehicle-to-vehicle charging.

FIG. 3 is a flow diagram illustrating an example process 300 for actuating a charging process upon identifying a PHEV for charging based on a determination that the PHEV's engine will start and identifying a BEV to provide charging to the identified PHEV to prevent the PHEV's engine from starting. Process 300 can be implemented in a computing system including one or more vehicle computing devices 115 and/or a server computer 120 in communication with the computing device(s) 115 via a network 130. In an example, the vehicle computer or the server computer performs all of the steps. Other examples are possible in which the steps are distributed between two computers. While certain steps may be described as being performed by the server, for example, it is to be understood that they could be performed alternatively by the vehicle computer (or one of the vehicle computers) or vice versa. Process 300 includes multiple blocks that can be executed in the illustrated order. Process 300 could alternatively or additionally include more or fewer blocks and/or include the blocks executed in different orders.

Process 300 begins at block 302 when, e.g., the server computer 120 receives information for a PHEV 200 including battery 206 state-of-charge, destination and/or location, battery temperature and/or ambient temperature. The server can also receive information for BEVs 230 that may be available for charging the PHEV 200 including battery 234 state-of-charge and distance and/or travel time to the PHEVs location or destination.

At block 310 the server identifies a PHEV 200 for charging based on a determination that the PHEV's engine 202 will start prior to the PHEV's battery 206 being charged from an external power source. In an example, block 310 can include blocks (or sub-blocks) 304, 306, and 308.

At decision block 304 a vehicle computing device determines if the temperature (e.g., ambient and/or battery temperature) is outside a specified range (i.e., whether it is above a high temperature threshold or below a low temperature threshold), e.g., as explained above, the specified range could be determined based on temperatures determined likely to result in the activation of a vehicle BTMS, air conditioner, and/or heater. If the ambient temperature, e.g., as determined by a vehicle temperature sensor, is outside the specified temperature range, the process 300 moves to block 306 where the PHEV's estimated range (that is, the estimated range is an estimated distance that the vehicle can travel before running out of stored electrical power for electric motors that can move the vehicle) is adjusted. Otherwise, if the ambient temperature is within the specified temperature range, the process 300 moves to decision block 308.

At block 306, when it is determined that the PHEV's BTMS, air conditioner, and/or heater will be activated, the estimated range that its battery 206 can provide given its current state-of-charge can be reduced by, e.g., an empirically determined factor e.g., 20 percent.

At decision block 308, the vehicle computing device determines if the distance 252 to the PHEV's next charging location (e.g., home charging station 250) is beyond the range that its battery 206 can provide given its current state-of-charge and any adjustments for ambient temperature from block 306. If the distance 252 to the PHEV's next charging location is beyond the range that its battery 206 can provide then it can be determined that the PHEV's engine 202 will start in order to propel the vehicle and/or to charge the battery 206, and the process 300 proceeds to block 312. Otherwise, if the distance 252 to the PHEV's next charging location is within the range that its battery 206 can provide, then it can be determined that the PHEV's engine 202 will not start and the process 300 proceeds back to block 302 to further monitor whether the PHEV will need charging. Alternatively, although not shown in the diagram of the process 300, the process 300 could be terminated upon a negative determination in the block 308 and or at some other suitable time, for example, if user input is received to stop the process, if the process is only scheduled to run at certain times, etc.

At block 312 the server computer identifies BEV 230 to provide charging to the identified PHEV 200 to prevent the PHEV's engine from starting. An available BEV 230 can be identified based on a state-of-charge of the BEV's battery 234. In an example, in some implementations, a user of the BEV 230 can set a minimum state-of-charge threshold for making the BEV 230 available to charge other vehicles. Alternatively or additionally, the user could be allowed or required to set a minimum extra margin of range beyond that which is necessary to reach the BEV's next charging location as a precondition for availability to charge other vehicles. Identifying an available BEV 230 could also include identifying the BEV based on proximity (i.e., distance from) and/or travel time to a destination in common with the PHEV 200. For example, a maximum travel time threshold, e.g., 15 minutes, for traveling to a common destination can be set so both vehicles are likely to be in the same place at the same time.

At block 314, once an available BEV 230 is identified to provide charging, the server computer can transmit location information to the PHEV and/or the BEV for navigating to a common destination, such as a parking lot or garage. In some examples, location/navigation information can be provided to an HMI 212 in the PHEV and/or BEV.

At block 316 the system verifies an electrical connection between the BEV 230 and the PHEV 200. Once the vehicles have navigated to locations close to each other, a cable can be connected between the charging ports of the vehicles. The server can prompt the user(s) to plug in the cable via the vehicles' respective HMIs once the server verifies they are at the same location, for example. The vehicles' power electronics can sense the cable is connected and provide that information to the system. For example, this could be detected through a battery charge control module (BCCM).

At block 318 the system actuates a BEV to PHEV charging process. The process can include transferring energy from the BEV to the PHEV up to a specified maximum state-of-charge for the PHEV or a minimum state-of-charge for the BEV. The vehicles can authenticate/ID each other via a communication between both vehicles to the server computer 120, where authentication can be pre-approved once the two vehicles are matched. Once one vehicle approaches the other (for example, the BEV 230 arrives at a parking location next to the PHEV 200, or vice versa), the two vehicles may recognize each other through a variety of methods (Bluetooth, NFC, camera vision, or simply on GPS matched location, etc.) and because they are pre-authenticated, the vehicle arriving can plug in and power transfer starts. In another example, the plug can have a communication protocol similar to plug-and-charge (PnC) where upon plugging in, authentication is done through communication between the PHEV 200 and the BEV 230, then charging commences.

At block 320 the system monitors the charging process to determine an amount of energy transferred from the BEV to the PHEV. The system can also determine a distance that the PHEV has traveled on electric power since a last charge (e.g., additional electric vehicle miles traveled) based on a charge state (percent charge) after the last charge and the amount of energy transferred from the BEV to the PHEV. In some examples, the system could determine an emissions reduction achieved by preventing the PHEV's engine from starting based on the amount of energy transferred from the BEV to the PHEV.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random-access memory, etc.

A computer-readable medium (also referred to as a processor-readable medium) includes any non-transitory (i.e., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention. Any use of "based on" and "in response to" herein, including with reference to media, processes, systems, methods, etc. described herein, indicates a causal relationship, not merely a temporal relationship.

What is claimed is:

1. A method for vehicle-to-vehicle charging, comprising:
   identifying a plug-in hybrid electric vehicle (PHEV) for charging based on a determination that the PHEV's engine will start prior to the PHEV's battery being charged from an external power source;
   identifying a battery electric vehicle (BEV) to provide charging to the identified PHEV;
   transmitting location information to at least one of the PHEV or the BEV for navigating to the location of the other of the PHEV or the BEV;
   verifying an electrical connection between the BEV and the PHEV; and
   actuating a BEV to PHEV charging process.

2. The method of claim 1, further comprising determining that the PHEV's engine will start based on a state-of-charge of the PHEV's battery and an ambient temperature.

3. The method of claim 2, wherein determining that the PHEV's engine will start includes determining that the PHEV's air conditioner or heater will activate when the ambient temperature is outside a specified range.

4. The method of claim 3, wherein determining that the PHEV's engine will start includes determining that the state-of-charge of the PHEV's battery provides a range that is less than a distance to the external power source.

5. The method of claim 1, wherein determining that the PHEV's engine will start includes determining that a battery thermal management system will activate when a temperature of the PHEV's battery is outside a specified range.

6. The method of claim 1, further comprising monitoring the charging process to determine an amount of energy transferred from the BEV to the PHEV.

7. The method of claim 6, further comprising determining additional all electric vehicle miles traveled based on the amount of energy transferred from the BEV to the PHEV.

8. The method of claim 1, wherein identifying the BEV includes identifying the BEV based on a state-of-charge of the BEV's battery.

9. The method of claim 1, wherein identifying the BEV includes identifying the BEV based on proximity and/or travel time to a destination in common with the PHEV.

10. The method of claim 1, further comprising displaying a notification regarding the location of a BEV that is available for charging on a graphical user interface of the PHEV.

11. A system, comprising:
a vehicle computer including a processor and memory, the memory including instructions executable by the vehicle computer to:
determine that a PHEV needs charging based on a determination that the PHEV's engine will start prior to the PHEV's battery being charged from an external power source; and
verify an electrical connection between a BEV and the PHEV; and
a server computer including a processor and a memory, the memory including instructions executable by the server computer to:
identify the BEV to provide charging to the PHEV;
transmit location information to at least one of the PHEV or the BEV for navigating to the location of the other of the PHEV or the BEV; and
actuate a BEV to PHEV charging process.

12. The system of claim 11, wherein the instructions to determine that the PHEV's engine will start include instructions to determine that the PHEV's air conditioner or heater will activate when an ambient temperature is outside a specified range.

13. The system of claim 12, wherein the instructions to determine that the PHEV's engine will start include instructions to determine that a state-of-charge of the PHEV's battery provides a range that is less than a distance to the external power source.

14. The system of claim 11, wherein the instructions to identify the BEV include instructions to identify the BEV based on a state-of-charge of the BEV's battery.

15. The system of claim 11, wherein the instructions to identify the BEV include instructions to identify the BEV based on proximity and/or travel time to a destination in common with the PHEV.

16. The system of claim 11, wherein the instructions to transmit location information include instructions to display a notification regarding the location of a BEV that is available for charging on a graphical user interface of the PHEV.

17. A system, comprising:
a vehicle computer including a processor and memory, the memory including instructions executable by the vehicle computer to:
verify an electrical connection between a BEV and a PHEV; and
actuate a BEV to PHEV charging process; and
a server computer including a processor and a memory, the memory including instructions executable by the server computer to:
identify the PHEV for charging based on a determination that the PHEV's engine will start prior to the PHEV's battery being charged from an external power source;
identify the BEV to provide charging to the identified PHEV; and
transmit location information to at least one of the PHEV or the BEV for navigating to the location of the other of the PHEV or the BEV.

18. The system of claim 17, wherein the instructions to determine that the PHEV's engine will start include instructions to determine that the PHEV's air conditioner or heater will activate when an ambient temperature is outside a specified range.

19. The system of claim 18, wherein the instructions to determine that the PHEV's engine will start include instructions to determine that a state-of-charge of the PHEV's battery provides a range that is less than a distance to the external power source.

20. The system of claim 17, wherein the instructions to identify the BEV include instructions to identify the BEV based on a state-of-charge of the BEV's battery.

* * * * *